UNITED STATES PATENT OFFICE.

MORGAN W. BROWN, OF WEST FARMS, NEW YORK.

IMPROVED METHOD OF PREPARING PAPER FOR WRAPPING TOBACCO, SNUFF, SOAP, AND OTHER ARTICLES.

Specification forming part of Letters Patent No. 74,195, dated February 11, 1868; antedated January 27, 1868.

*To all whom it may concern:*

Be it known that I, MORGAN W. BROWN, of West Farms, in the county of Westchester, in the State of New York, have invented a new and improved mode for the treatment and preparation of paper, cloth, and vegetable fibrous substances for the purposes and application of inclosing, and protecting from drying, tobacco, snuff, soaps, drugs, chemical substances, paints, putty, also groceries, medicinal preparations, &c.; and I do hereby declare that the following is a full and exact description thereof.

The nature of my invention consists in the use of a composition of glycerine and an alkali; glycerine being the principal vehicle, and a caustic or carbonated alkali, auxiliary to the perfecting of this composition of matter for the purposes of saturating or coating the paper or cloth, &c., preparatory to its application, to protect from drying various solid and powdered substances.

To enable others skilled in the art to make, prepare, and use my material, and its application to the substances herein named, I will proceed to describe the mode and process, first, of preparing the chemical vehicle solutions, &c.

I take the glycerine in the purified state, and reduce its specific gravity to about 20° or 25° with water, and then add to the glycerine about ten parts of pearl-ash or saleratus in a weak solution to about every one hundred parts of the glycerine, and agitate the mixture well together until well mixed. The best method of mixing the two substances together is at the common temperatures; but it can also be heated, if necessary. This preparation I now use to saturate the paper, cloth, or vegetable fibrous substances by applying it to the surfaces of the articles to be saturated with a brush or in any other convenient manner. I use a bath and the submersion of the paper, cloth, &c.; then drain it slightly, press it, and fold or pack up. For use for boxes and other pasteboard packages they are saturated and the pores well filled, then simply drained. For all thick packages the solution can be moderately heated, as it will penetrate and saturate the substance more rapidly. I also find that the glycerine vehicle, in admixture with alkaline solutions prepared and rendered weak and made from any of the solid caustic, carbonated, or silicated alkalies, answers the purpose; but I prefer the solutions made from the soda and potash alkalies. I also find that the common unbleached commercial glycerine is useful and more economical for the solutions, and I use it, as well as the purified glycerine, depending altogether on the quality of the substances to be incased and protected—as, for example, all drugs or medicines or substances used for food, as groceries, dry or semi-fluid. I use in substance the purified white glycerine to saturate the paper or other vegetable fibrous or wood materials used as coverings for the substances named hereinbefore; and I use and apply the common glycerine in admixture with a small percentage of the weak alkalies for the paper or cloth coverings for the wrapping and inclosing of snuff, tobacco, soaps, paints, putty, and other animal and vegetable substances, to prevent their drying. I use for the solutions the glycerine at various degrees of density, from 5° to 25° Baumé, according to the articles to be protected and the substances to be preserved. 15° to 20° is sufficient in most uses, and it can be used to advantage as dense as 30° or upward. The solution of soda, pearl-ash, or other carbonate, caustic, or silicated alkalies, I use generally at 2° to 5°, and sometimes above 5°, Baumé. A thin solution of soap may also at times be used in substitution for the alkaline solutions and admixted with the glycerine. I use any of the perfumes to impart fragrant odors to the vehicle or solutions preparatory to the coating or immersion of the paper, cloth, or vegetable fibrous substance with good effect in many of its applications. I also use, where it is necessary to impart to the white ground of paper or cloth any of the well-known dyes, stains or colors for the purpose of ornamenting or beautifying the same, the coloring matter being put into the solutions used for the purposes hereinbefore named; and I can use any of the colored papers, cloth, &c., the same, and for the applications and uses herein specified in the same manner and for the same purposes.

I find by long practical experiments and tests which I have made on paper, cloth, &c., saturated with this preparation, that it will retain its moisture and pliability for some months, even when exposed to the atmosphere at common temperatures, and is also a protection to all of the substances named herein and inclosed as specified from frosts in cold weather, and is one of its principal benefits, as well as in its applications and utility and value, as well as economy, for the especial uses herein specified.

In most uses I find that the common glycerine answers all the purposes, and is very cheap when purchased by the quantity, in barrels; and I find that the packages, envelopes, and boxes saturated with this vehicle may also in some cases have an application of any of the oil or resinous varnishes or water and air proof coatings applied to the outside or exterior of the wrapper, package, or box as an additional protection to the process I have herein described and set forth; or I can use any one of the tin or other metallic foils over and on the exterior of the prepared paper, cloth, or vegetable fibrous substance, &c., as herein set forth.

I use this aforesaid preparation to all boxes and vessels of any form or size that has the properties of absorption, and composed and constructed of vegetable fibrous materials—as wood, paper, &c.; also on sheets of paper, cloth, or vegetable fibrous substances before or after the same are formed into the shape of envelopes, packages, boxes, &c; or the use and application of the solution over and on paper boxes, packages of cloth, wood, and paper that have been previously and are coated with paints, colors, or any earthy porous cements, paints, colors, or washes containing oil or water colors.

What I claim as my invention, and desire to secure by Letters Patent, is—

A composition of matter as herein substantially set forth and specified, and its uses and application to the preparation and treatment of paper, cloth, and vegetable fibrous substances, for the uses and purposes herein specified and set forth.

MORGAN W. BROWN.

Witnesses:
JOHN WHITE,
STEPHEN USTICK.